Figures 1, 2, 3:
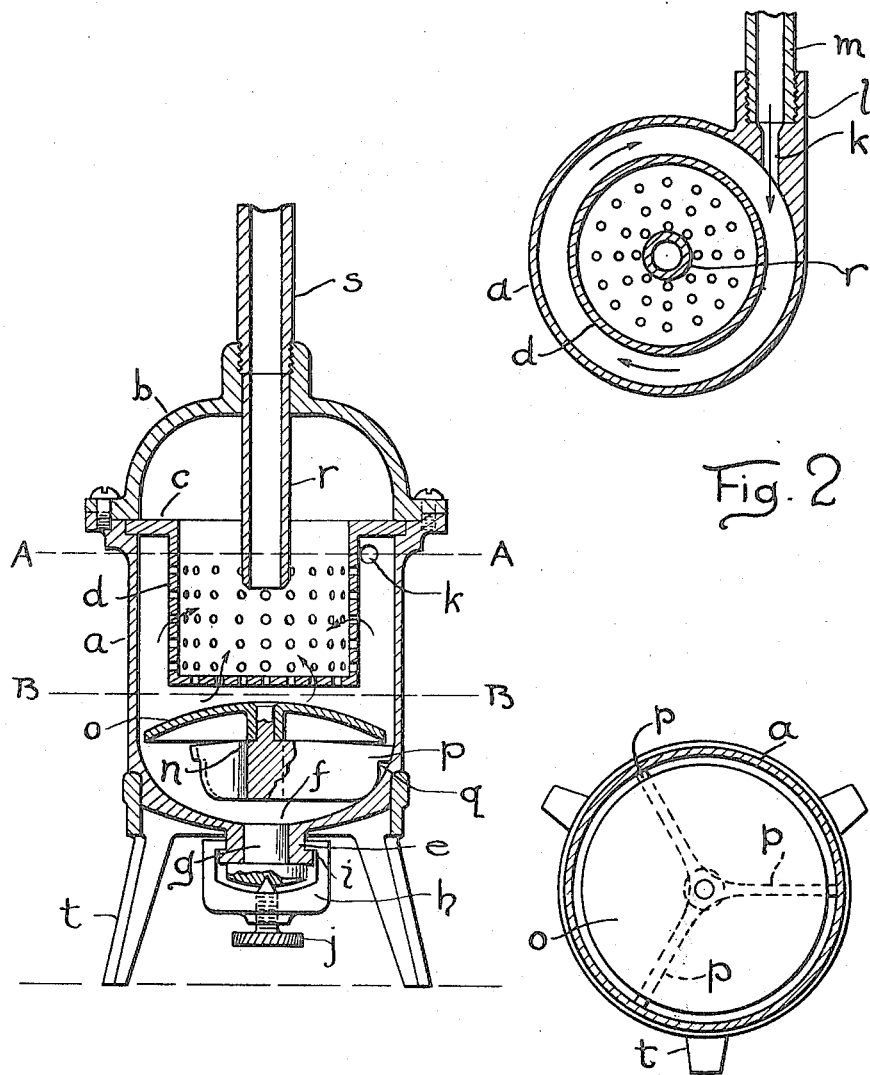

R. M. BLACKMER.
GRIT SEPARATOR.
APPLICATION FILED MAR. 11, 1914.

1,202,356.

Patented Oct. 24, 1916.

WITNESSES
Robert N. Van Buskirk
Virginia C. Spratt.

INVENTOR
Robert M. Blackmer
BY
Ralzemond A. Parker
ATTORNEY

UNITED STATES PATENT OFFICE.

ROBERT M. BLACKMER, OF DETROIT, MICHIGAN, ASSIGNOR OF ONE-HALF TO STEPHEN A. GRIGGS, OF WALKERVILLE, ONTARIO, CANADA.

GRIT-SEPARATOR.

1,202,356.  Specification of Letters Patent.  Patented Oct. 24, 1916.

Application filed March 11, 1914. Serial No. 837,612.

*To all whom it may concern:*

Be it known that I, ROBERT M. BLACKMER, a citizen of the United States, residing at Detroit, county of Wayne, State of Michigan, have invented a certain new and useful Improvement in Grit-Separators, and declare the following to be a full, clear, and exact description of the same, such as will enable others skilled in the art to which it pertains to make and use the same, reference being had to the accompanying drawings, which form a part of this specification.

This invention relates to separators for use in connection with gritty water and has for its object apparatus adapted to separate grit and other heavy matter from water so as to prevent injury to pumps and apparatus through which the water is taken.

In the drawings,—Figure 1, is a vertical section. Fig. 2, is a cross section on the line A—A of Fig. 1. Fig. 3, is a cross section on the line B—B of Fig. 1.

The apparatus comprises a cylindrical shell $a$ upon which may be clamped by screws a cap $b$. The cylindrical shell is recessed at the top and on the inside to form a step which receives the annular flange $c$ of the cylindrical screen $d$. This cylindrical screen has a cylindrical shell open at the top and provided with an end at the bottom. The shell and end are perforated. The cylindrical shell $a$, as appears in the drawing, is open at the upper end but closed at the bottom by a wall which gradually slopes toward the axis of the cylindrical shell. At the said axis there is a neck $e$ which is provided with an opening $f$ normally closed by the plug $g$ which is held in place by the yoke $h$ which has in-turned ends for its arms which engage in the groove formed between the annular shoulder $i$ on the outside of the neck and the end wall of the shell $a$. The screw $j$ screws through the yoke and holds the plug $g$ tightly in place by drawing the in-turned ends of the yoke arms against the shoulder $i$ of the neck. Near the top of the shell $a$ is located the intake opening $k$. The opening passes through a neck portion $l$ of the casting which forms the shell $a$. This neck portion is internally screwthreaded on its outer end to receive the conduit $m$. The passageway through the conduit $m$ and neck $l$ approximates a tangential relation with the shell $a$ and has a true tangential relation with respect to the screen $d$ which is held in spaced relation with respect to the shell $a$ by reason of the annular flange $c$. At the bottom of the shell $a$ rests a baffle member $n$ which comprises a hood $o$ surmounting a plurality of vanes $p$. These vanes are spaced from the hood $o$ and are also notched at the ends (at $q$) to allow the passage of the water therearound and thereover.

A depending pipe $r$ protrudes down through the center of the cap $b$ and into the interior of the screen $d$. This depending pipe is important for it allows the creation of a vacuum in the separator above the mouth of this pipe $r$. This vacuum space always affords extra room in the separator so that at no time is the water choked therein. The avoidance of this choking is important in my separator for otherwise the choking would interrupt the continuous inflow and interfere by stopping the momentum of the inflowing water requiring an extra pull to again get the water flowing. The choking would also stop the swirling of the water in the separator. This choking occurs because with a reciprocating pump the suction is not continuous and hence the outflow is not continuous. A pipe $s$ is a continuation of the pipe $r$ and leads outwardly from the cap $b$.

All the parts so far described are supported by the legs $t$ which fit into the closed end of the shell $a$.

The operation of the device is as follows: The device is intended primarily for interposition between the source of water and the pump which is drawing water from the source. It is intended to protect the pump and other apparatus through which the water may flow from the heavier and gritty foreign substances which are drawn through water, such as irrigation water and water taken from shallow bodies of water. The water is sucked into the shell $a$ at the orifice $k$. By reason of entering tangentially with respect to the screen $d$, the water swirls around in the space between the shell and the screen. This causes the heavier particles, such as sand and the like, to be thrown against the shell $d$ where eventually it drops by gravity in the space between the periphery of the hood $o$ and the shell $a$. The vanes $p$, however, stop the swirling of the water at the bottom of the shell and consequently when the sediment passes below the hood $o$ it is given an opportunity to settle and reach a state of quiescence.

Inasmuch as the foreign particles and grit are thrown outward by the centrifugal force incidental to the swirling of the water, they are kept away from the perforations in the screen so that they are unlikely to pass through the perforations in the screen and out of the pipe r. Not only is this advantage accomplished, but also the swirling water sweeps the perforations in the screen free of any foreign substances that may chance to lodge against them. After the heavy particles thrown against the inside of the shell a drop below the hood o by gravity, the sediment may be removed through the opening f by loosening the yoke h and removing the plug g.

What I claim is:

A separator, having in combination, a cylindrical shell, a cylindrical screen supported therein in spaced relation, an inlet passage leading into the space between the screen and the shell and discharging tangentially thereof, means for stopping the swirling of the water, comprising a hood surmounting a plurality of vanes, said hood and vanes being located below the bottom of the shell, and an outlet pipe leading from the inside of the screen.

In testimony whereof, I sign this specification in the presence of two witnesses.

ROBERT M. BLACKMER.

Witnesses:
VIRGINIA C. SPRATT,
STUART C. BARNES.

Copies of this patent may be obtained for five cents each, by addressing the "Commissioner of Patents, Washington, D. C."